July 19, 1949.　　　　A. W. BECKER　　　　2,476,579
HOT AIR GAS HEATER

Filed March 24, 1945　　　　　　　　　　　　　　3 Sheets-Sheet 1

Inventor
Aloysius W. Becker
by Arthur W. Nelson
Atty.

July 19, 1949. A. W. BECKER 2,476,579
HOT AIR GAS HEATER
Filed March 24, 1945 3 Sheets-Sheet 2

Inventor
Aloysius W. Becker
by Arthur W. Nelson
Atty.

July 19, 1949.   A. W. BECKER   2,476,579
HOT AIR GAS HEATER
Filed March 24, 1945   3 Sheets-Sheet 3
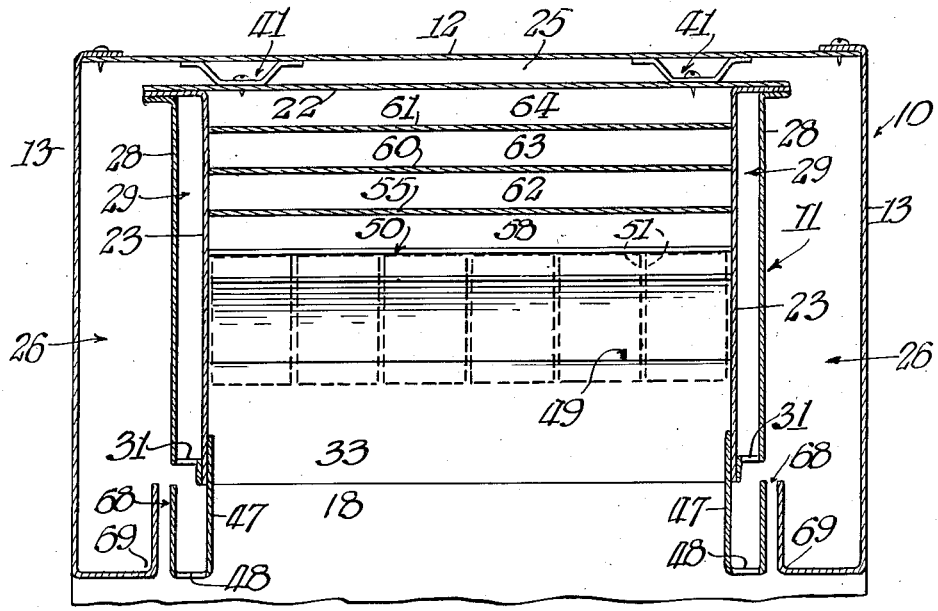
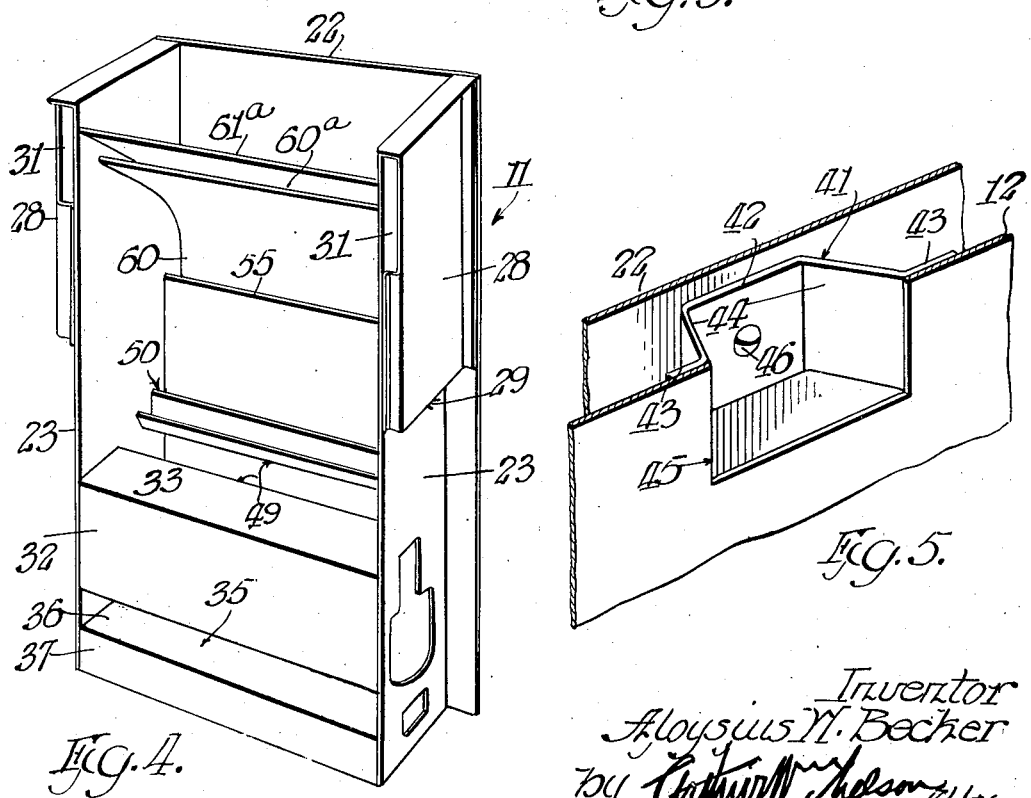
Inventor
Aloysius W. Becker Patented July 19, 1949

2,476,579

UNITED STATES PATENT OFFICE 2,476,579

HOT-AIR GAS HEATER

Aloysius W. Becker, Chicago, Ill., assignor to Dearborn Stove Company, Chicago, Ill., a corporation of Illinois Application March 24, 1945, Serial No. 584,541

9 Claims. (Cl. 126—90)

This invention relates to improvements in heaters and it consists of the matters hereinafter described and more particularly pointed out in the appended claims.

The heater, with which the present invention is more especially concerned is of the so-called "cabinet" type and usually includes an outer casing and an inner heating element casing with an air space therebetween. The inner casing has a combustion chamber in which is located a burner for fuel such as a gas. Said casing is made to provide flues for the inlet and the circulation of the air that is heated by the burning fuel; for passage through open front upper portions of both casings into the space to be heated. A heater of this general type is disclosed in my prior Patent 1,848,150 of March 8, 1932.

One of the objects of the present invention is to provide a heater of the kind mentioned, which has a greater air heating and circulating efficiency while maintaining the outer casing or cabinet in such relatively cool condition as will eliminate danger of scorching curtains or drapes, blistering woodwork and walls and furniture that may be contiguous the heater.

Another object of the invention is to provide in a heater of this kind, an improved construction for the circulating air flues in which the flues cannot be "robbed" of air by the demand of the burner for air for combustion purposes and whereby a better air circulation is afforded for space heating purposes without sacrificing efficient combustion at the burner.

A further object of the invention is to provide a heater of this kind which shall be compact in size and yet wherein the outer casing may be kept in a safer and cooler condition than heretofore possible in a heater of similar size and capacity.

The above mentioned objects of the invention, as well as others, along with the advantages thereof, will more fully appear as the specification proceeds.

In the drawings:

Fig. 3 is a horizontal sectional view through the improved space heater as taken on the line 3—3 of Fig. 1.

Fig. 4 is a perspective view of the inner heating element or casing of the improved heater, on a scale reduced from that of Figs. 1, 2 and 3.

Fig. 5 is a detail view in perspective of parts of the backs of the inner and outer casings respectively, on a scale enlarged over that of Figs. 1, 2 and 3 and more particularly illustrates one form of spacing connection between said backs.

Figure 1:
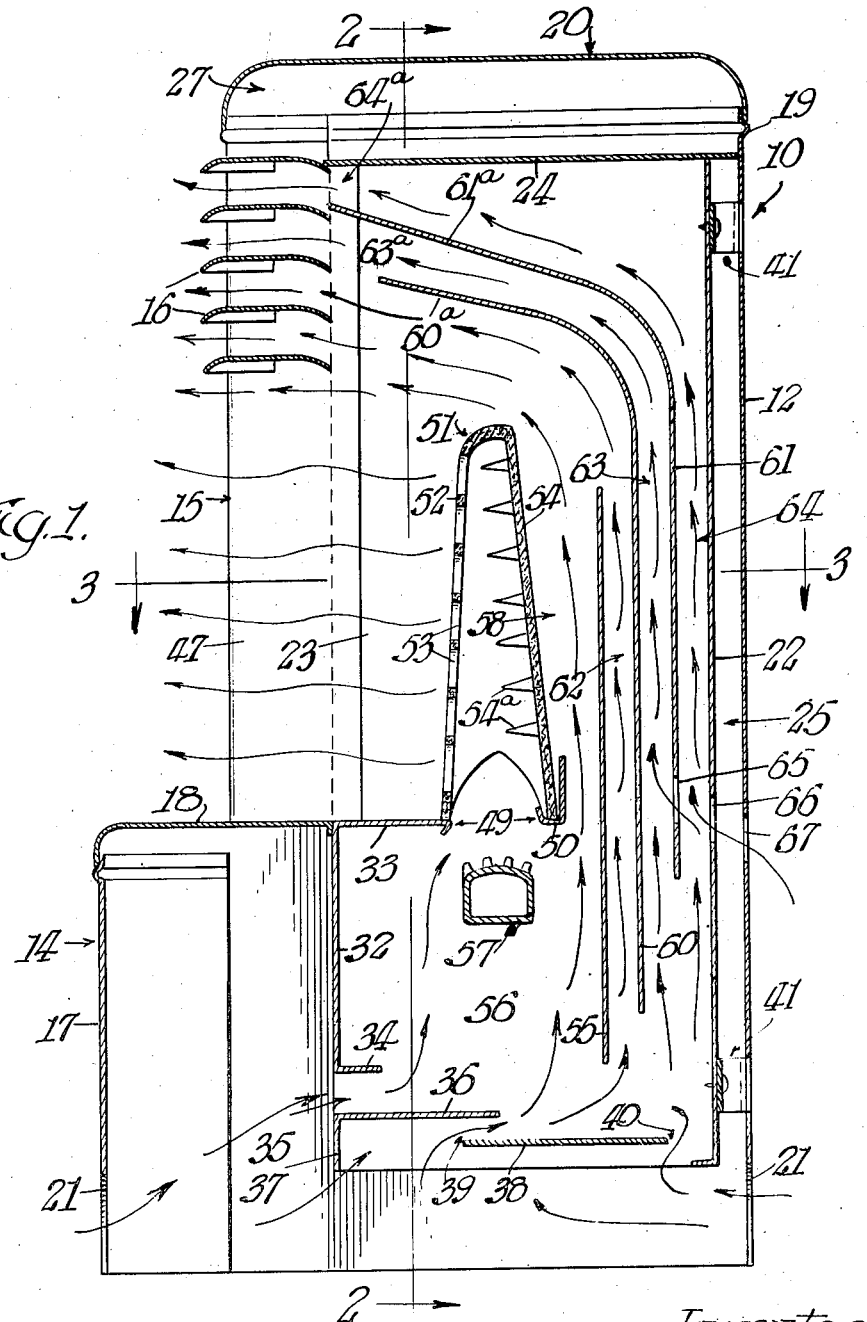
Fig. 1 is a front to rear vertical sectional view through a space heater embodying one form of the invention, as taken on the line 1—1 of Fig. 2.

Referring now in detail to that embodiment of the invention illustrated in the drawings, 10 indicates as a whole the cabinet or outer casing and 11 indicates as a whole the heating element or inner casing of the heater, the latter casing appearing in perspective in Fig. 4. Both of said casings are made of relatively thin sheet metal.

The outer casing includes an upright back wall 12 and upright side walls 13—13. The lower front closed portion 14 (see Fig. 1) of the casing 10 is deeper from front to rear than the upper front portion 15 and in the top end of said upper front portion a series of vertically spaced warm air deflecting louvers 16—16 are provided. The lower front closed portion includes an upright front wall 17 and a rearwardly extending top wall 18. The top wall 18 acts to deflect warm air, issuing from the open front of the heater above it in an outward horizontal direction, forwardly from the heater as a whole.

The back and side walls 12 and 13 are beaded toward their top ends to provide a seat 19 for a cover or top 20. The lower margins of the wall 12 and front closed portion 14 respectively, are cut away as at 21 in Figs. 1 and 2 to provide for the inlet of air into the bottom end of the outer casing from the front and rear thereof.

The heating element or inner casing 11 which is shown in perspective on a reduced scale in Fig. 4 has a height, depth and width less than the outer casing 10. It includes an upright back wall 22 and upright side walls 23, spaced inwardly from the lateral edges of the back wall, and said side walls are spaced inwardly from the side walls 13—13 of the outer casing. The inner casing also includes a top wall 24 see Fig. 1 (not shown in Fig. 4) which engages at three of its edges with the back and side walls of the outer casing. This construction provides an air space 25 between the back walls 12 and 22 of both casings and an air space 26 between the side walls 13—13 and 23—23 of both casings 10 and 11. The top walls 20 and 24 coact to provide a closed air space 27 at the top end of the heater as a whole.

Operatively secured to but spaced from the upper portion of each side wall 23 of the inner casing are panels 28—28. These panels in connection with the associated side wall 23 provide channels 29—29 that are open at the bottom as at 30 (in Fig. 2) and are open at the upper half of their front portions as indicated at 31 in Fig. 4. As before mentioned, the upper front portion of the inner casing is open while its lower front portion is closed by a front wall portion 32 and a relatively short horizontal top wall portion 33 that forms a continuation of the wall portion 18 of the outer casing, as best appears in Figs. 1 and 4. The wall 32 is provided along its bottom edge with an inwardly extending flange 34 which forms the top for a front air inlet opening 35 bottomed by a deeper flange or baffle 36 that extends inwardly from the bottom end 37 of the front wall portion 32. Between, but spaced from the back wall 22 and wall portion 37 of the casing 11, in a plane between the baffle 36 and bottom edge of the casing as a whole is another baffle 38 which provides bottom air inlet opening 39 and 40 respectively.

The casing 11 is supported in part from the casing 10 by means of substantially U-shaped spacing clips 41—41. As best appears in Fig. 5, each clip includes a central part 42, lateral wings 43—43 and connecting portions 44—44. The wings 43—43 are spot welded to the inner face of the back wall 12 of the outer casing, at opposite sides of an opening 45 therein. The central part 42 of each clip is adapted to engage the outer surface of the back wall 22 of the inner casing and then be secured thereto by a screw 46. The openings 45 in the back wall give access for tools used in applying the screws 46.

Associated with and projecting forwardly from the front margin of each side wall 23 of the inner casing and extending from the wall portion 34 to the top wall 25 is a finishing strip 47 of a U-shaped cross section. The front web of each strip has a plurality of openings 48 therein, certain of which line up with the front outlet openings 31 of the channels 29 before mentioned.

Rearwardly from the rear edge of the wall portion 33 of the casing 11 and separated therefrom by a space 49 is a transverse ledge strip 50 having front and rear flanges. This ledge strip is supported at its ends from the side wall 23—23 of the inner casing 11.

The rear marginal portion of the wall 33 and the ledge strip 50 provide the supports for the front and rear margins of a plurality of side by side, upright open bottom hollow refractory tiles 51—51. The front wall 52 of each tile has heat escape openings 53 therein and the rear wall 54 is provided on its inner face with forward projections 54a to increase the heat absorbing and radiating efficiency of the tile. As best appears in Fig. 1, the open bottom of the tiles span the space 49.

Spaced rearwardly from the ledge strip 50 is an upright baffle 55 that is supported at its sides from side walls 23—23 of the inner casing. As shown herein the bottom edge of said baffle is disposed substantially in the plane of the flange 34 before mentioned and its top edge terminates somewhat below the plane of the top edges of the tiles 51—51.

The lower portion of the baffle 55 in conjunction with the wall portions 35—34 and the ledge 50 provide a combustion chamber 56 and in the upper portion of this chamber, centrally below and in line with the space 49 before mentioned is located a transversely extending burner 57. In this instance the burner is one adapted for the use of gas as a fuel.

The upper portion of the baffle 55 and the rear walls of the tiles 51—51 define a flue 58, the bottom end of which communicates with the upper rear portion of the combustion chamber 56. Said combustion chamber is defined at its sides by the side walls 23, at the upper part of its front by the wall 32, at the upper part of its back by the lower part of the baffle 55, at its top by the wall 33 and ledge strip 50, and at its bottom by the baffles 36 and 38, respectively. The upper end of said flue opens into the upper portion of the inner casing 11.

Spaced equal distances between the baffle 55 and the back wall 22 of the inner casing and from each other are intermediate and rear baffles 60 and 61 respectively. The bottom portions of said baffles are upright while their upper portions 60a and 61a are directed upwardly and forwardly in flaring relation, as best appears in Fig. 1 and are connected to the respective lower portions by curved corner parts of substantial radius.

Figure 2:
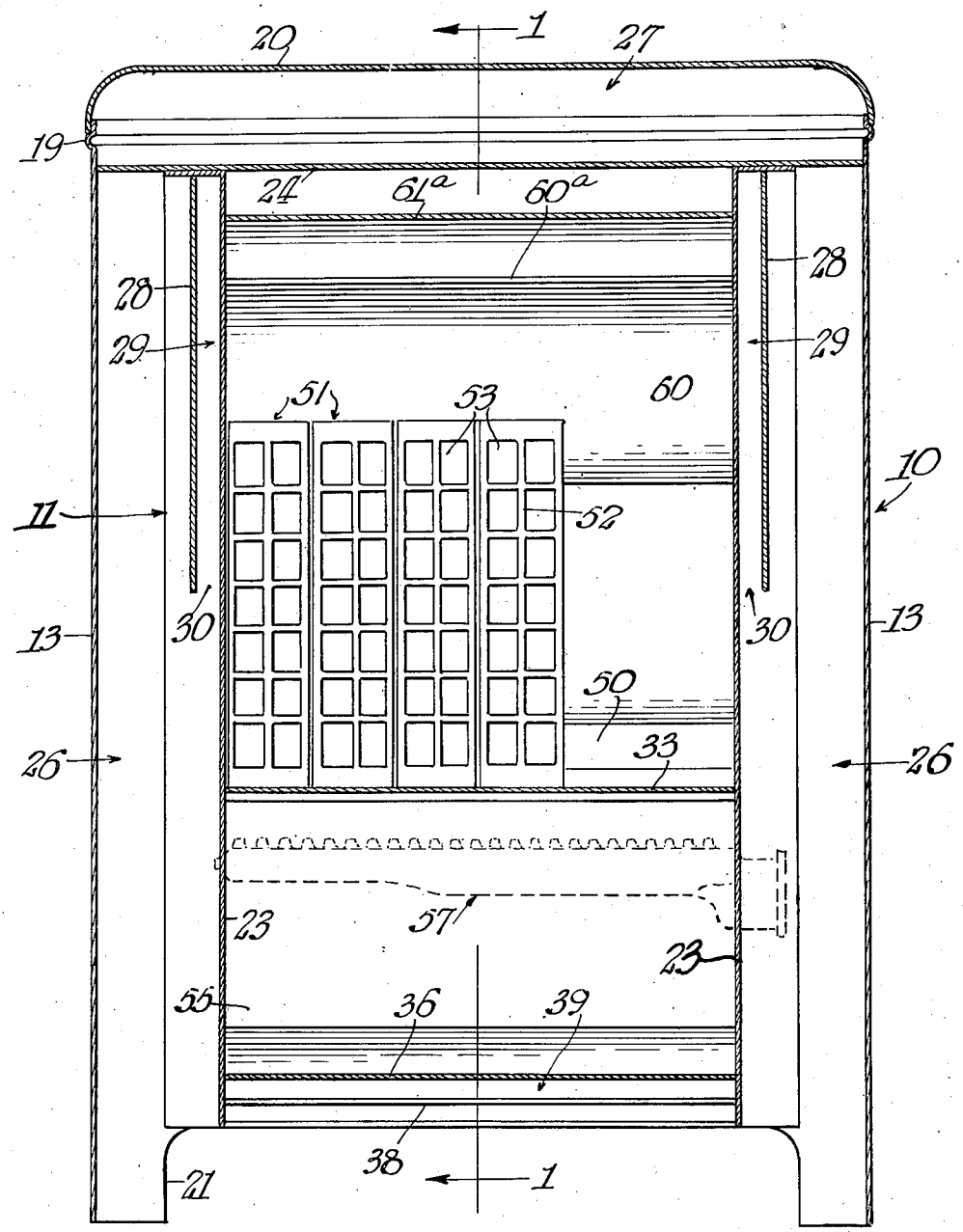
Fig. 2 is a side to side vertical sectional view through the space heater shown in Fig. 1 as taken on the line 2—2 thereof.

The bottom end edges of the baffles 55—60 and 61 respectively are preferably arranged in a stepped relation and wherein the bottom edge of the baffle 60 is disposed at an elevation a suitable distance above the bottom edge of the baffle 55 while the bottom edge of the baffle 61 is disposed at an elevation a greater distance above the bottom edge of the baffle 60 as best appears in Fig. 1.

The baffles 55—60 and 61 respectively define upright flues 62—63 and 64 respectively, all of substantially the same cross sectional area as shown herein. However, such areas may be made unequal within certain limits without affecting their function.

It will be noticed from Fig. 1 that the flue 62 opens at its upper end into the upper portion of the casing below the baffle part 60a and that the upper end of the flue 63 increases in cross sectional area toward its upper front end discharge mouth 63a. By reason of this increase in cross sectional area at said mouth, choking of the flue due to the volumetric expansion of the heated air is avoided. Thus a free open non-choking flue is assured for the upward passage of air therethrough.

The upper portion of the flue 64 opens into the top end of the casing where the top wall 24 and the part 61a of the baffle 61 coact to provide an outlet opening 64a for said portion of the flue at the top front portion of the casing.

By reason of the burner 57 in the combustion chamber 56 and the air heated thereby, a considerable draft action is induced toward the combustion chamber for the air entering the casing from the inlet 40. This draft action tends to "rob" the lower inlet end of especially the flues 63 and 64 of air so that the volume of air entering said flues is materially reduced. To counteract this robbing effect, auxiliary air inlets are provided therefor above said lower inlet ends and whereby secondary air is taken in from the rear of the outer casing and passes to said flues at points above said lower inlet ends. To accomplish this function, the rearmost baffle 61 is provided with a transverse opening 65 (see Fig. 1) toward its bottom end. Associated with said opening are openings 66 and 67 respectively in the back walls 22 and 12 of the inner and outer casings. Said openings are arranged at different lower elevations as best appears in Fig. 1, in order to give an upward directional effect to the entering air. In other words, the said openings are not all disposed in the same horizontal plane but in a stepped relation. Thus the air entering the opening 67 does not have to turn abrupt right angled corners in entering the flues but enters in an upwardly and inclined direction. The arrangement described assures a full volume of air for the flues 64 and 63 for discharge out through the open front of the casing. Thus greater efficiency is obtained from the fuel consumed and a cooler casing is afforded for the heater as a whole. The increased efficiency enables the use of a compact sized casing even for a relatively large capacity heater.

In this respect it is pointed out that a part of the air entering the opening 67 in the back wall of the outer casing will pass into the air space 25 which as obvious from Fig. 3 communicates at its sides with the air spaces 26—26 at each side of the heater and which spaces communicate with atmosphere out through spaces 68—68 (see Fig. 3) between the parts 40 and parts 69 of said outer casing.

In Fig. 1, arrows are shown to indicate the passage of the cool air into and through the heater and the outlet of the heated air from the heater as well as the heat radiated from the tiles 51—51.

As before pointed out, the heater is so efficient that the outer casing remains substantially cool. Hence the heater finish will not check and the heater may be safely used in close proximity to drapes, curtains, woodwork, walls and other articles.

While in describing the invention I have referred in detail to the form, arrangement and construction of the parts involved, the same is to be considered only in the illustrative sense and therefore I do not wish to be limited thereto except as may be specifically pointed out in the appended claims.

I claim as my invention:

1. In a space heater, an inner heating element casing having an open front upper portion for the discharge of heated air therefrom and a closed front lower portion having an air inlet therein and top and back walls, means providing a combustion chamber in the casing having a discharge space in the plane of said top wall and with parts in communication with said upper and lower portions respectively, hollow heat-radiating tile means spanning said space above said top wall, means in said casing coacting with said top and back walls in forming air flues in the casing to the rear of said combustion chamber and which flues at their upper ends discharge toward the open front upper portion of the casing, the bottom ends of said flues constituting an air inlet for said flues, an outer casing including a back wall that is spaced rearwardly from the back wall of the inner casing to provide an air space therebetween, and means providing another air inlet for at least one of said flues and which air inlet opens through the back walls of said inner and outer casings, at an elevation above said first mentioned air inlet.

2. In a space heater, an inner heating element casing having an open front upper portion for the discharge of heated air therefrom and a closed front lower portion having an air inlet therein and top and back walls, means providing a combustion chamber in the casing having a discharge space in the plane of said top wall and with parts in communication with said upper and lower portions respectively, hollow heat-radiating tile means spanning said space above said top wall, a burner in said combustion chamber relatively close to said space, means in said casing coacting with said top and back walls in forming air flues in the casing to the rear of said combustion chamber and which flues at their upper ends discharge toward the open front upper portion of the casing, the bottom ends of said flues constituting an air inlet for said flues, an outer casing including a back wall that is spaced rearwardly from the back wall of the inner casing to provide an air space therebetween, and means providing another air inlet for a plurality of said flues and which air inlet opens through the back walls of said inner and outer casings, at an elevation above said first mentioned air inlet.

3. In a space heater, an inner heating element casing having an open front upper portion for the discharge of heated air therefrom and a closed front lower portion having an air inlet therein and top and back walls, means providing a combustion chamber in the casing having a discharge space in the plane of said top wall and with parts in communication with said upper and lower portions respectively, hollow heat-radiating tile means spanning said space above said top wall, a burner in said combustion chamber relatively close to said space, means in said casing coacting with said top and back walls in forming air flues in the casing to the rear of said combustion chamber and which flues at their upper ends discharge toward the open front upper portion of the casing, the bottom ends of said flues constituting an air inlet for said flues, an outer casing including a back wall that is spaced rearwardly from the back wall of the inner casing to provide an air space therebetween, said second mentioned means and said back walls of said inner and outer casing respectively having air inlet openings therein for another inlet of air into at least certain of said flues at elevations above that of the first mentioned air inlet for said flues.

4. In a space heater, an inner heating element casing having an open front upper portion for the discharge of heated air therefrom and a closed front lower portion having an air inlet therein and top and back walls, means providing a combustion chamber in the casing having a discharge space in the plane of said top wall and with parts in communication with said upper and lower portions respectively, hollow heat-radiating tile means spanning said space above said top wall, a burner in said combustion chamber relatively close to said space, means in said casing coacting with said top and back walls in forming air flues in the casing to the rear of said combustion chamber and which flues at the upper ends discharge toward the open front upper portion of the casing, the bottom ends of said flues constituting an air inlet for said flues, an outer casing including a back wall that is spaced rearwardly from the back wall of the inner casing to provide an air space therebetween, said second mentioned means and said back walls of said inner and outer casing respectively having air inlet openings therein for another inlet of air into said flues at elevations above that of the first mentioned air inlet for said flues, said last mentioned openings in said back walls and said second mentioned means being arranged at successive upward elevations with the opening in the back wall of the outer casing at the lowest elevation.

5. In a space heater, an inner heating element casing having an open front upper portion for the discharge of heated air therefrom and a closed front lower portion having an air inlet therein and top and back walls respectively, means providing a combustion chamber in the casing having a discharge space in the plane of said top wall and with parts in communication with said upper and lower portions respectively, hollow heat-radiating tile means spanning said space above said top wall, a burner in said combustion chamber relatively close to said space, partitions in said casing coacting with the back wall thereof in providing a plurality of air flues in the casing to the rear of the combustion chamber and which flues at their upper ends discharge toward the open front of said upper portion of the casing, the lower open ends of said flues forming the air inlets therefor and which inlets are disposed at different elevations in said lower portion of the casing, an outer casing including a back wall that is spaced rearwardly from the back wall of the inner casing to provide an air space therebetween, and air inlet providing means in said back walls for said flues, at an elevation above that of the first mentioned air inlet ends of said flues.

6. In a space heater, an inner heating element casing having an open front upper portion for the discharge of heated air therefrom and a closed front lower portion having an air inlet therein and top and back walls, means providing a combustion chamber in the casing having a discharge space in the plane of said top wall and with parts in communication with said upper and lower portions respectively, hollow heat-radiating tile means spanning said space above said top wall, a burner in said combustion chamber relatively close to said space, partitions in said casing having parts to the rear of the combustion chamber and having other parts above the combustion chamber and which other parts flare vertically away from each other to provide a discharge mouth for at least one of said flues, said mouth opening toward said front upper portion of the casing and having a cross sectional area greater than that of said one of said flues, the lower end of said flues providing an air inlet for said flues.

7. In a space heater, an inner heating element casing having an open front upper portion for the discharge of heated air therefrom and a closed front lower portion having an air inlet therein and top and back walls, means providing a combustion chamber in the casing having a discharge space in the plane of said top wall and with parts in communication with said upper and lower portions respectively, hollow heat-radiating tile means spanning said space above said top wall, a burner in said combustion chamber relatively close to said space, partitions in said casing having parts to the rear of the combustion chamber and having other parts above the combustion chamber and which other parts flare vertically away from each other to provide a discharge mouth for at least one of said flues, said mouth opening toward said front upper portion of the casing and having a cross sectional area greater than that of said one of said flues, the lower end of said flues providing one air inlet therefor, and means in said back wall of the casing and in one of said partitions providing another air inlet for said flues at an elevation above the first mentioned one.

8. In a space heater, the combination of an inner casing and an outer casing, both open at their front upper portion and closed at their front lower portions, each casing including side walls and a back wall so that an air space is present between the back walls and the side walls of both casings, means providing a combustion chamber in the inner casing having a discharge space through the top of its lower portion, a burner in said combustion chamber below said space and relatively close thereto, hollow heat-radiating tile means in the upper portion of the inner casing spanning said space, means also in said inner casing coacting with the back and side walls thereof in forming air flues to the rear of the combustion chamber and which flues at their upper end discharge toward the open front upper portions of the casing, the bottom end of said flues constituting an air inlet for said flues; there being openings in the outer casing providing for a secondary inlet of air into at least certain of said flues at an elevation above said bottom inlet ends thereof and for an inlet of air into the air space between the back walls of both casings.

9. In a space heater, an inner heating element casing having sides, a back wall an open front upper portion for the discharge of heated air therefrom and a closed front lower portion including a horizontal wall and a vertical wall, said vertical wall having an air inlet opening therein, a vertical partition in said casing between said horizontal and said back wall and coacting with said sides and said vertical and said horizontal wall and extending above and below the latter to define a combustion chamber, other vertical partitions in said inner casing between said back wall and said first mentioned partition having their upper portions directed toward said open front upper portion and defining flues in said inner casing, the bottom edges of said other vertical partitions being spaced above the edge of the first mentioned partition and at different elevations, one relative to the other, an outer casing having a back wall spaced from the back wall of the inner casing, the outer casing having a closed lower front that includes a horizontal wall forming a continuation of the said horizontal wall of the inner casing and a vertical front wall having an air inlet opening therein, there being air inlet openings in the back walls of the inner and outer casings, and means spaced rearwardly from the horizontal wall of the inner casing to provide a discharge space therebetween, open bottom heat-radiating tile means spanning said space and supported on the horizontal wall of the inner casing and said means, a burner within the inner casing below and relatively close to said space, said horizontal wall portions of said inner and outer casings coacting to deflect the radiant heat from said tile horizontally outward from the lower part of the front upper portion of said inner casing.

ALOYSIUS W. BECKER.

REFERENCES CITED

The following references are of record in the file of this patent:

UNITED STATES PATENTS

| Number | Name | Date |
|---|---|---|
| 1,456,472 | Stein | May 22, 1923 |
| 1,669,078 | Clarke | May 8, 1928 |
| 1,703,900 | Rowley | Mar. 5, 1929 |
| 1,848,150 | Becker | Mar. 8, 1932 |
| 1,931,903 | Payne | Oct. 24, 1933 |
| 1,937,217 | Bartlebaugh | Nov. 28, 1933 |

FOREIGN PATENTS

| Number | Country | Date |
|---|---|---|
| 502,945 | Great Britain | Mar. 28, 1939 |